United States Patent
Shah

(10) Patent No.: US 9,329,794 B1
(45) Date of Patent: May 3, 2016

(54) SYSTEM AND METHODS FOR DATA MIGRATION

(75) Inventor: Bhavik Shah, Ahmedabad (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 1655 days.

(21) Appl. No.: 12/691,629

(22) Filed: Jan. 21, 2010

(51) Int. Cl.
    *G06F 12/00* (2006.01)
    *G06F 3/06* (2006.01)

(52) U.S. Cl.
    CPC .................. *G06F 3/0647* (2013.01)

(58) Field of Classification Search
    CPC .................................................. G06F 3/0647
    USPC ................... 711/161–162, 165; 370/351, 355
    See application file for complete search history.

(56) References Cited

U.S. PATENT DOCUMENTS

| 7,464,232 B2 * | 12/2008 | Shibayama et al. ........... 711/161 |
| 7,839,815 B2 * | 11/2010 | Feder et al. .................... 370/328 |
| 2010/0275219 A1 * | 10/2010 | Carlson et al. ................ 719/326 |

* cited by examiner

*Primary Examiner* — Jasmine Song
(74) *Attorney, Agent, or Firm* — Klein, O'Neill & Singh, LLP

(57) ABSTRACT

Method and system for migrating information from a source storage to a destination storage is provided. The method includes (a) receiving a migration request to migrate information from the source storage to the destination storage; wherein a router receives the migration request; (b) placing a reservation on the source storage such that no other system can write to the source storage, once the migration of information from the source storage to the destination storage is initiated; wherein the router sends a reservation request to a system that manages the source storage and the system grants the reservation request to the router; (c) migrating information from the source storage to the destination storage, while the reservation is placed on the source storage; and (d) releasing the reservation after migration is completed in step (c).

20 Claims, 3 Drawing Sheets

SYSTEM AND METHODS FOR DATA MIGRATION

BACKGROUND

The present invention relates to storage systems.

RELATED ART

Networking systems are commonly used to share information among different computing systems and devices. In a typical computer networking environment, various computing systems can access mass storage devices in one or more storage arrays. Information that is stored at a first storage device or storage volume may be referred to as a source storage device or storage volume. Information from the source storage device may be migrated to a destination storage device or destination volume.

When information is migrated from the source storage to the destination storage, one assumes that no computing system is writing to the affected source storage device. However, in conventional migration techniques, this assumption may not be true because there is no mechanism to ensure that during data migration, a computing system is not writing to the source storage volume from where data is being migrated. If another system is writing to the source storage, it may result in corrupt data migration. Continuous efforts are being made to reduce data migration corruption.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which include reducing the likelihood of conflicts between two drivers sharing a particular hardware resource.

In one embodiment, a method for migrating information from a source storage to a destination storage is provided. The method includes (a) receiving a migration request to migrate information from the source storage to the destination storage; where a router receives the migration request; (b) placing a reservation on the source storage such that no other system can write to the source storage, once the migration of information from the source storage to the destination storage is initiated; where the router sends a reservation request to a system that manages the source storage and the system grants the reservation request to the router; (c) migrating information from the source storage to the destination storage, while the reservation is placed on the source storage; and (d) releasing the reservation after migration is completed in step (c).

In another embodiment, a system is provided. The system includes a computing system having access to a source storage and a destination storage via a router. Information stored at the source storage device is migrated to the destination storage device in response to a migration request that is received by the router. The router then sends a reservation request to a system that manages the source storage and the system grants the reservation request to the router which places a reservation on the source storage such that no other system can write to the source storage, after the migration of information from the source storage to the destination storage is initiated. Thereafter, the reservation is released after information from the source storage to the destination storage is migrated.

In yet another embodiment, a network router with a plurality of ports for communicating with a computing system, a source storage and a destination storage is provided. The computing system has access to the source storage and the destination storage via the router and information stored at the source storage device is migrated to the destination storage device in response to a migration request. The router receives the migration request, sends a reservation request to a system that manages the source storage and the system grants the reservation request to the router which places a reservation on the source storage such that no other system can write to the source storage, after the migration of information from the source storage to the destination storage is initiated. Thereafter, the reservation is released after information from the source storage to the destination storage is migrated.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various embodiments of the present system and methods will be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

Figure 1A:
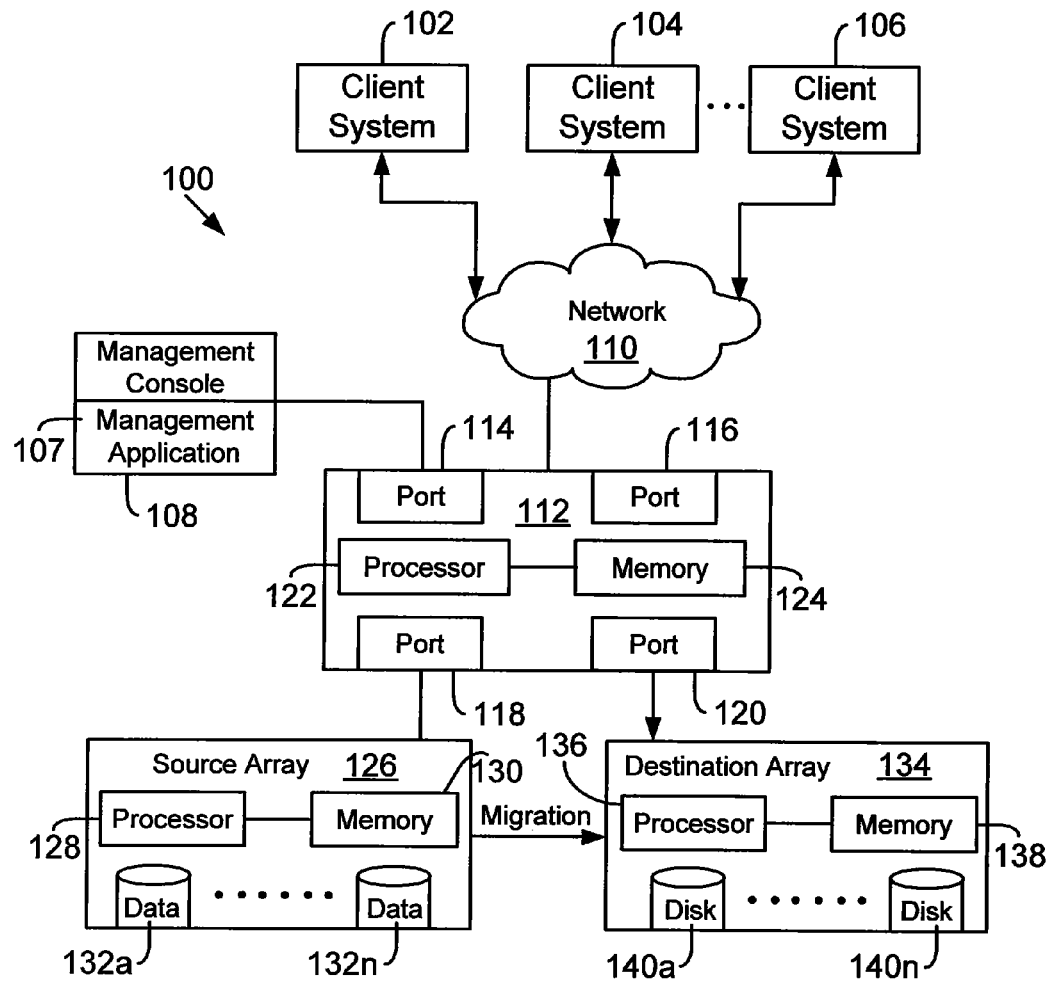
FIG. 1A is a block diagram of a system used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

System:

FIG. 1A is a block diagram of a system 100 for using the embodiments disclosed herein. There may be other systems/components that may be placed between the aforementioned components but they are not germane to the embodiments disclosed herein. System 100 may include one or more client computing systems 102-106 (may also be referred to as "computing systems 102-106") interfacing with a network 110 to read and write information from storage devices in storage arrays 126 and 134. Typically, applications executed by the client systems 102-106 issue read and write requests to read and write information from the storage devices. The requests are processed via a router 112 that is also coupled to network 110 or directly to the client systems. In another embodiment, the read and write requests may be processed by the storage arrays without a router.

Typically, a physical storage device in a storage array is presented to a client as a logical entity or storage volumes for storing information. One example of such a logical entity is a LUN (logical unit number). Each LUN that is presented to the client systems includes attributes and unique identifiers. An application executed by the client system typically reads and writes data to the LUN. In this context, the terms LUN, storage volume and storage device are used interchangeably throughout this specification.

Two different storage arrays are shown in FIG. 1A. One is a source storage array 126 that has a plurality of storage devices 132a-132n. Storage array 126 includes a processor 128 that executes instructions out of memory 130 to control storage array 126 operations. The operations include moving information to one of the disks on a write command and reading information from one or more disks, in response to a read command.

Storage array 126 is referred to as a source array because a client may have written information at one or more storage devices 132a-132n. The data written at 132a-132n may then be moved to a destination array 134. Destination array 134 is similar to source array 126, i.e. it includes a processor 136, memory 138 and storage devices 140a-140n.

Router 112 may include a plurality of front end ports 114-116 that interface with client systems 102-16 and another computing system 108. Computing system 108 may be a dedicated management console executing a management application 107.

Router 112 may also include a plurality of back-end ports 118-120 that interface with storage arrays 126 and 134. Router 112 may also include a processor 122 that executes programmable instructions (for example, firmware) out of memory 124 to control router 112 operations.

In response to a migration request, data is moved from source storage array 126 to destination storage array 134. The migration may be scheduled by a user during a configuration step that is performed by management application 107 or requested by a client.

Conventional migration techniques have shortcomings. One such short coming is the possibility of corruption when data is migrated from a source array (or storage volume) to a destination array (or destination volume). The following provides an example of how corruption may occur during conventional data migration:

At time t0, router 112 receives a migration request from client 102 to move information from 132a to 140a. When the request is received, client 104 also has write access to storage device 132a. At time t2, data migration begins and while the migration is in process, client 104 writes to storage 132a. The migration may not be able to capture the write by computing system 104 and hence the migrated information may not be accurate and may be corrupt. The embodiments disclosed herein reduce the chances of corruption, according to one embodiment.

Figure 1B:
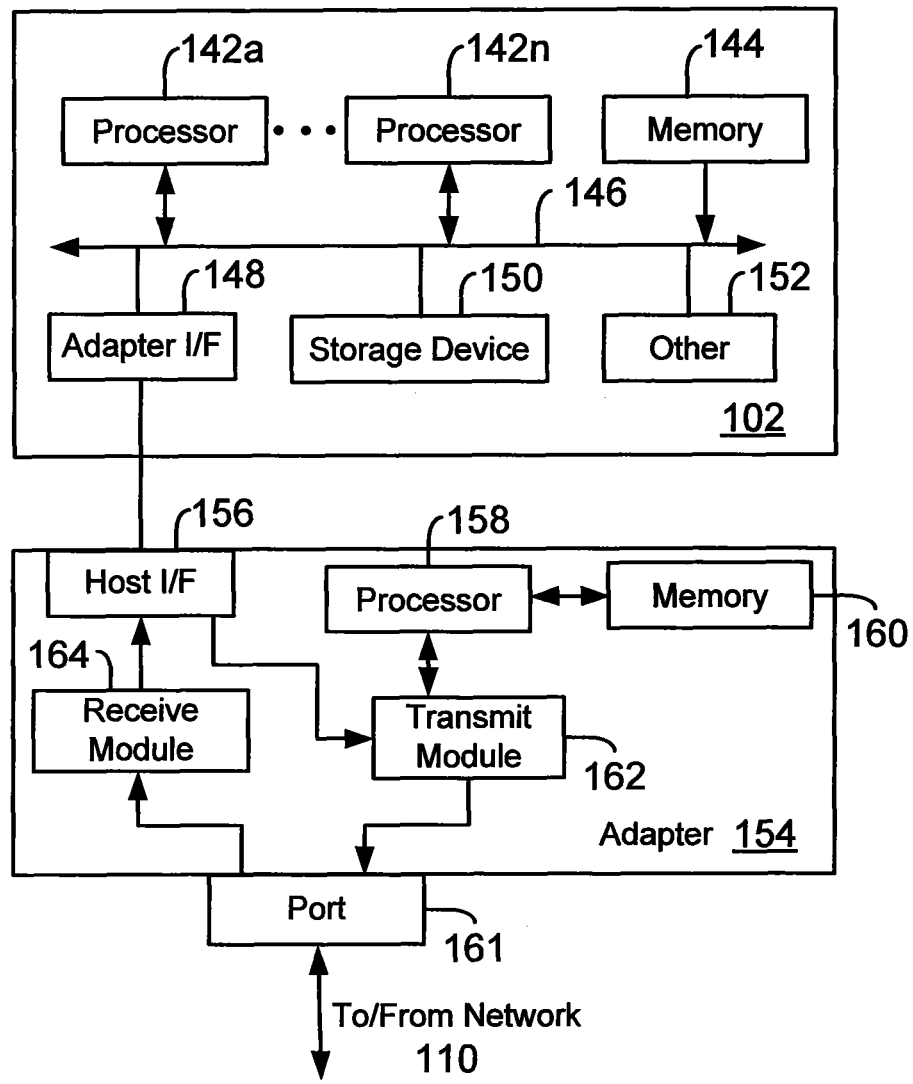
FIG. 1B shows a block diagram of a computing system adapter, used according to one embodiment.

FIG. 1B shows an example of computing system 102 used in system 100 of FIG. 1A. Although the example of FIG. 1B references computing system 102, it may be used for management console 108, client systems 104, 106, as well as for managing storage array 126 and 134.

Computing system 102 may include one or more processors 142a-142n (jointly referred to as processor 142), also known as a central processing unit (CPU), interfacing with other components via a computer bus 146. The computer bus 146 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

Computing system 102 may include a storage device 150, which may be for example a hard disk, a CD-ROM, a non-volatile memory device (flash or memory stick) or any other device. Storage 150 may store processor executable instructions and data, for example, operating system program files, application program files, and other files. Some of these files are stored on storage 150 using an installation program. For example, the processor 142 may execute computer-executable process steps of an installation program so that the processor 142 can properly execute the application program.

Processor 142 interfaces with memory 144 that may include random access main memory (RAM), and/or read only memory (ROM). When executing stored computer-executable process steps from storage 150, the processor 142 may store and execute the process steps out of memory 104. ROM may store invariant instruction sequences, such as start-up instruction sequences or basic input/output operating system (BIOS) sequences for operation of a keyboard (not shown).

Computing system 102 may also include other devices and interfaces 152, which may include a display device interface, a keyboard interface, a pointing device interface and others.

Computing system may also include an adapter interface 148 that allows computing system 102 to interface with adapter 154. The link between adapter 154 and adapter interface 148 may be a peripheral bus, for example, a PCI, PCI-X or PCI-Express link. The adapter may be configured to handle both network and storage traffic using various network and storage protocols to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. Adapter 154 may be configured to operate as a FCOE adapter and may be referred to as FCOE adapter 154. QLogic Corporation, the assignee of the present application, provides one such adapter. Those of ordinary skill in the art will appreciate, however, that the present embodiments are not limited to any particular protocol. The illustrated adapter 154 is merely one example of a converged network adapter that may leverage the advantages of the present embodiments.

Adapter 154 may include a host interface 156, adapter processor 158, memory 160, receive module 164 and a transmit module 162. The host interface 156 is configured to interface with computing system 102, via bus 156. As an example, bus 156 may be a PCI, PCI-X, PCI-Express or any other type of interconnect.

Memory 160 may be used to store programmable instructions, for example, firmware. The adapter processor 158 executes firmware stored in the memory 160 to control overall functionality of adapter 154 and also interface other devices.

Adapter 154 includes at least one port 161 for sending and receiving information. When information is received, it is processed by receive module 164 and sent to computing system 102 via host interface 156. When information is transmitted to another device, it is sent via a transmit module 162. It is noteworthy that the transmit and the receive module may be integrated into a single module to perform both receive side and transmit side functionality.

The structure of port 161 includes logic and circuitry for handling protocol specific information. For example, port 161 may include logic for handling Ethernet, Fibre Channel, InfiniBand, FCOE frames as well as frames that belong to other protocol and standards.

Figure 1C:
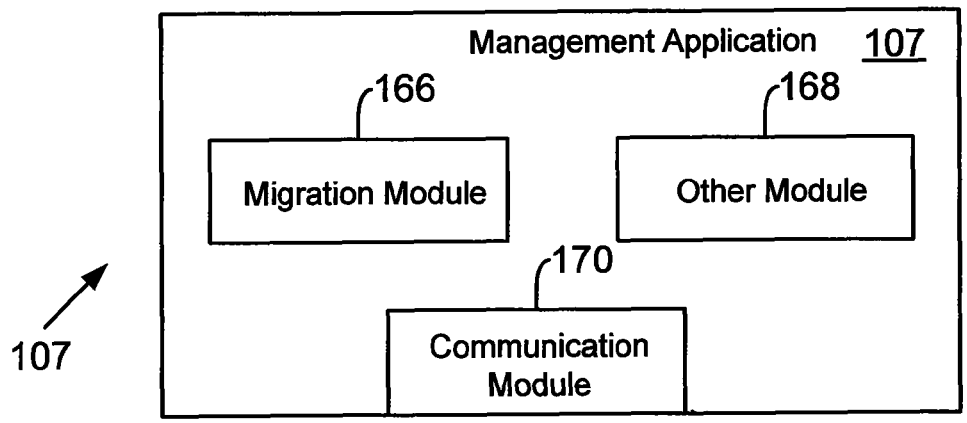
FIG. 1C shows an example of a management application, used according to one embodiment.

FIG. 1C shows a block diagram of management application 107 that may be used to configure and manage different components of system 100 (FIG. 1A). Management application 107 includes a communication module 170 that may be used to communicate with different components, for example, firmware for router 112. Management application may include a migration module 166 that may be used to configure migration of information from one storage location to another. Migration module 166 may also be used to send migration requests to router 112. Management application 168 may include other modules to perform other functions, for example, network and storage system diagnostics, storage device configuration and other functions.

Figure 2:
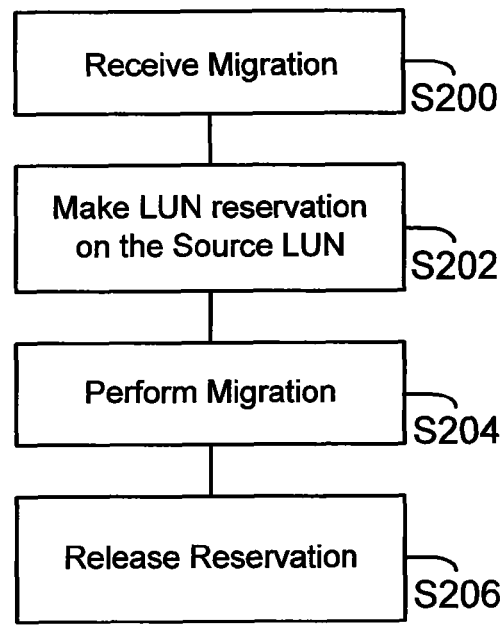
FIG. 2 shows a process flow diagram, according to one embodiment.

FIG. 2 shows a process flow diagram for performing data migration from a source storage to a destination storage, according to one embodiment. The process begins in block S200, when a migration request is received by router 112. The migration request may be sent by client system 102 (may also be referred to as an initiator) or management console 108. A processor executing programmable instructions out of a memory issues the migration request. Migration requests may be generated by a user or may be pre-programmed using management application 107. The migration request may be for a migration that is to be performed immediately or initiated at a later time. This could be ascertained from the request or may be defined by the user. After the request is received, router 112 determines when the migration is to be performed.

After the router receives the migration request and before migration is performed, router 112 makes a reservation at the source storage location that is affected by the migration. Router 112 makes the reservation by executing instructions out of memory and issuing a reservation command. In one embodiment, the reservation may be made by sending a SCSI (Small Computer System Interface) reservation command to source storage array 126. Source storage array 126 receives the reservation requests (also referred to as reservation commands) and places a reservation on the affected storage volume/LUN. Once the reservation is made, no other client system or device can access the affected storage volume.

SCSI supports two types of reservation commands, one is the SCSI Reserve Command and the other is a SCSI Persistent Reserve command. The SCSI Reserve Command is typically used by an initiator to obtain a reservation on a storage device (i.e. a target/LUN). Commands from initiators other than the one holding the reservation are rejected after the reservation is placed. Reservations are typically cleared by using a SCSI Release command. Reservation may be cleared when a SCSI Release command is received from the same initiator, a target RESET function is performed by any initiator, after a Target power cycle or a logout of the initiator from the target.

The SCSI Persistent Reservation commands are defined by the SCSI standard and provide a means to register input/output initiators and specify who can access LUN devices and the nature of the access for example, read-only, write-only or both. There are two types of SCSI Persistent Reserve commands, namely, the SCSI PERSISTENT RESERVE OUT command that is used by an initiator to establish, preempt, release and reset a reservation with a SCSI target; and the SCSI PERSISTENT RESERVE IN command that may be used by an initiator to query reservations or reservation keys from a target.

In one embodiment, SCSI PERSISTENT RESERVE commands may be used because reservations are not reset as a result of any reboots or recovery mechanisms and reservations are allowed from one or more initiators to be held at the same time. In case the system uses a plurality of routers, a migration request can also continue on a failover router without any impact to the reservations.

Thereafter, in block 5204, migration is performed without any disruption. Once the migration is complete, source storage array 126 releases the reservation and the source storage becomes available for other systems to access.

In one embodiment, because other systems cannot access a source storage volume during a migration request, it reduces the chances of corruption in the migration process.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method for migrating information from a source storage to a destination storage, comprising:
   (a) receiving a migration request to migrate information from the source storage to the destination storage; wherein a router receives the migration request;
   (b) the router determining when the migration is to be performed;
   (c) placing a reservation on the source storage such that no other system can write to the source storage, once the migration of information from the source storage to the destination storage is initiated; wherein the router sends a reservation request to a system that manages the source storage and the system grants the reservation request to the router;
   (d) migrating information from the source storage to the destination storage, while the reservation is placed on the source storage; and
   (e) releasing the reservation after migration is completed in step (d).

2. The method of claim 1, wherein the migration request is received from a client system that has access to the source storage.

3. The method of claim 1, wherein the migration request is received from a management application executed by a management console and operationally coupled to the router.

4. The method of claim 1, wherein the reservation is placed by using a small computer system interface (SCSI) reservation command.

5. The method of claim 1, wherein the source storage is a logical unit number that is presented to a client system for reading and writing information.

6. The method of claim 1, wherein the router is operationally coupled to a plurality of computing systems and facilitates processing of input/output requests.

7. The method of claim 6, wherein the plurality of computing systems use an adapter to communicate with the router and the source storage and the destination storage.

8. A system, comprising:
   a computing system having access to a source storage and a destination storage via a router; wherein information stored at the source storage device is migrated to the destination storage device in response to a migration request; wherein the router receives the migration request, determines when the migration is to be performed, sends a reservation request to a system that manages the source storage and the system grants the reservation request to the router which places a reservation on the source storage such that no other system can write to the source storage, after the migration of information from the source storage to the destination storage is initiated; and
   wherein the reservation is released after information from the source storage to the destination storage is migrated.

9. The system of claim 8, wherein the migration request is received from the computing system.

10. The system of claim 8, wherein the migration request is received from a management application executed by a management console and operationally coupled to the router.

11. The system of claim 8, wherein the reservation is placed by using a small computer system interface (SCSI) reservation command.

12. The system of claim 8, wherein the source storage is a logical unit number that is presented to a client system for reading and writing information.

13. The system of claim 8, wherein the router is operationally coupled to a plurality of computing systems and facilitates processing of input/output requests.

14. The system of claim 13, wherein the plurality of computing systems use an adapter to communicate with the router, the source storage and the destination storage.

15. A network router, comprising:
   a plurality of ports for communicating with a computing system, a source storage and a destination storage;
   wherein the computing system has access to the source storage and the destination storage via the router;
   wherein information stored at the source storage device is migrated to the destination storage device in response to a migration request;
   wherein the router receives the migration request, determines when the migration is to be performed, sends a reservation request to a system that manages the source storage and the system grants the reservation request to the router which places a reservation on the source storage such that no other system can write to the source storage, after the migration of information from the source storage to the destination storage is initiated; and
   wherein the reservation is released after information from the source storage to the destination storage is migrated.

16. The network router of claim 15, wherein the migration request is received from the computing system.

17. The network router of claim 15, wherein the migration request is received from a management application executed by a management console and operationally coupled to the router.

18. The network router of claim 15, wherein the reservation is placed by using a small computer system interface (SCSI) reservation command.

19. The network router of claim 15, wherein the source storage is a logical unit number that is presented to a client system for reading and writing information.

20. The network router of claim 15, wherein the router is operationally coupled to a plurality of computing systems and facilitates processing of input/output requests.

* * * * *